United States Patent [19]

Paul et al.

[11] Patent Number: 4,827,882
[45] Date of Patent: May 9, 1989

[54] INTERNAL REGENERATIVE COMBUSTION ENGINES WITH THERMAL INTEGRATED OPTIMIZED SYSTEM

[76] Inventors: Marius A. Paul; Ana S. Paul, both of 909 La Paz Rd., Placentia, Calif. 92690

[21] Appl. No.: 755,936

[22] Filed: Jul. 16, 1985

[51] Int. Cl.$^4$ .............................................. F02B 19/02
[52] U.S. Cl. ............................... 123/292; 123/48 AA; 123/79 A; 123/78 AA
[58] Field of Search ............. 60/618; 123/25 C, 25 D, 123/25 P, 79 A, 21, 253, DIG. 7, 90.12, 90.15, 90.16, 668, 48 AA, 78 D, 78 AA, 79 R, 190 BD, 48 D, 259, 78 D, 263, 275, 286, 292

[56] References Cited

U.S. PATENT DOCUMENTS

| | | | |
|---|---|---|---|
| 1,798,855 | 3/1931 | Scott | 123/79 R |
| 2,091,451 | 8/1937 | Phillips | 123/21 |
| 2,131,616 | 9/1938 | Christenson | 123/21 |
| 3,424,139 | 1/1969 | Brooks | 123/79 |
| 3,446,192 | 5/1969 | Woodward | 123/78 D |
| 3,964,452 | 6/1976 | Nakamura et al. | 123/78 D |
| 3,970,056 | 7/1976 | Morris | 123/48 D |
| 4,122,803 | 10/1978 | Miller | 123/25 P |
| 4,168,678 | 9/1979 | Nohira et al. | 123/48 D |
| 4,202,300 | 5/1980 | Skay | 123/48 D |
| 4,281,626 | 8/1981 | Fishe | 123/25 C |
| 4,392,459 | 7/1983 | Chareire | 123/90.11 |
| 4,469,055 | 9/1984 | Caswell | 123/78 B |
| 4,530,318 | 7/1985 | Semple | 123/90.17 |
| 4,572,116 | 2/1986 | Hedelin | 123/78 D |
| 4,615,306 | 10/1986 | Wakeman | 123/90.16 |

FOREIGN PATENT DOCUMENTS

| | | | |
|---|---|---|---|
| 2717370 | 10/1978 | Fed. Rep. of Germany | 123/48 D |
| 2440472 | 7/1980 | France | 123/48D |
| 0114625 | 6/1979 | Japan | 123/48 D |
| 0197438 | 11/1983 | Japan | 123/48 D |
| 0160050 | 9/1984 | Japan | 123/48 D |
| 0166711 | 8/1985 | Japan | 123/90.6 |
| 1552564 | 9/1979 | United Kingdom | 123/90.17 |

*Primary Examiner*—David A. Okonsky
*Attorney, Agent, or Firm*—Bielen and Peterson

[57] ABSTRACT

An optimized unitary energetic system for an internal combustion engine comprising a gas distribution system for intake and exhaust associated with an optimized variable geometry combustion chamber with a regenerative cylinder wall lining to contain thermal energy and a microprocessor to correlate certain factors and control the gas distribution system and combustion chamber geometry for optimization of engine operation.

6 Claims, 8 Drawing Sheets

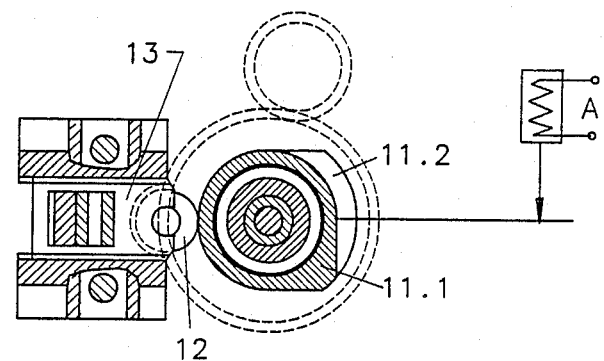
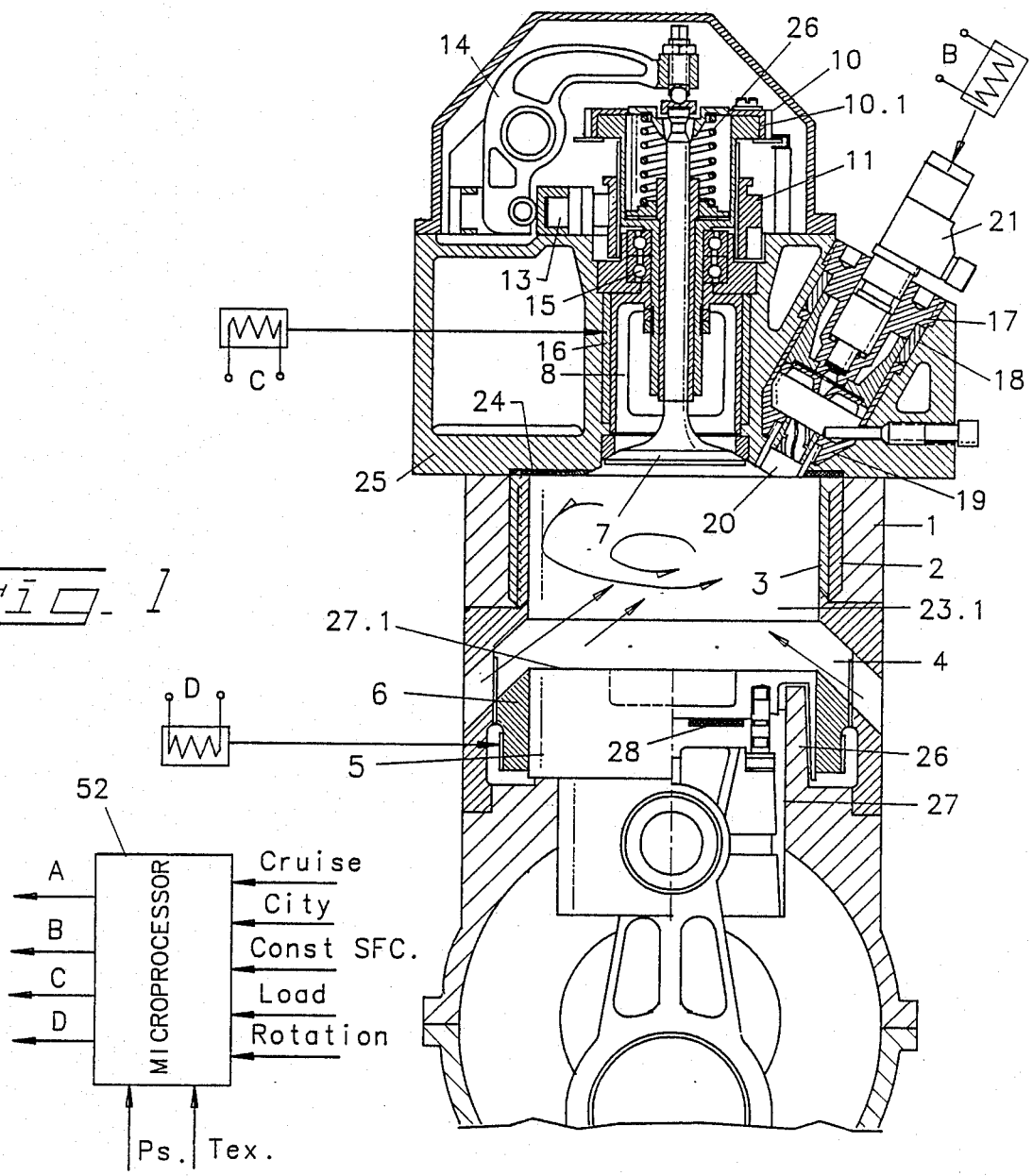

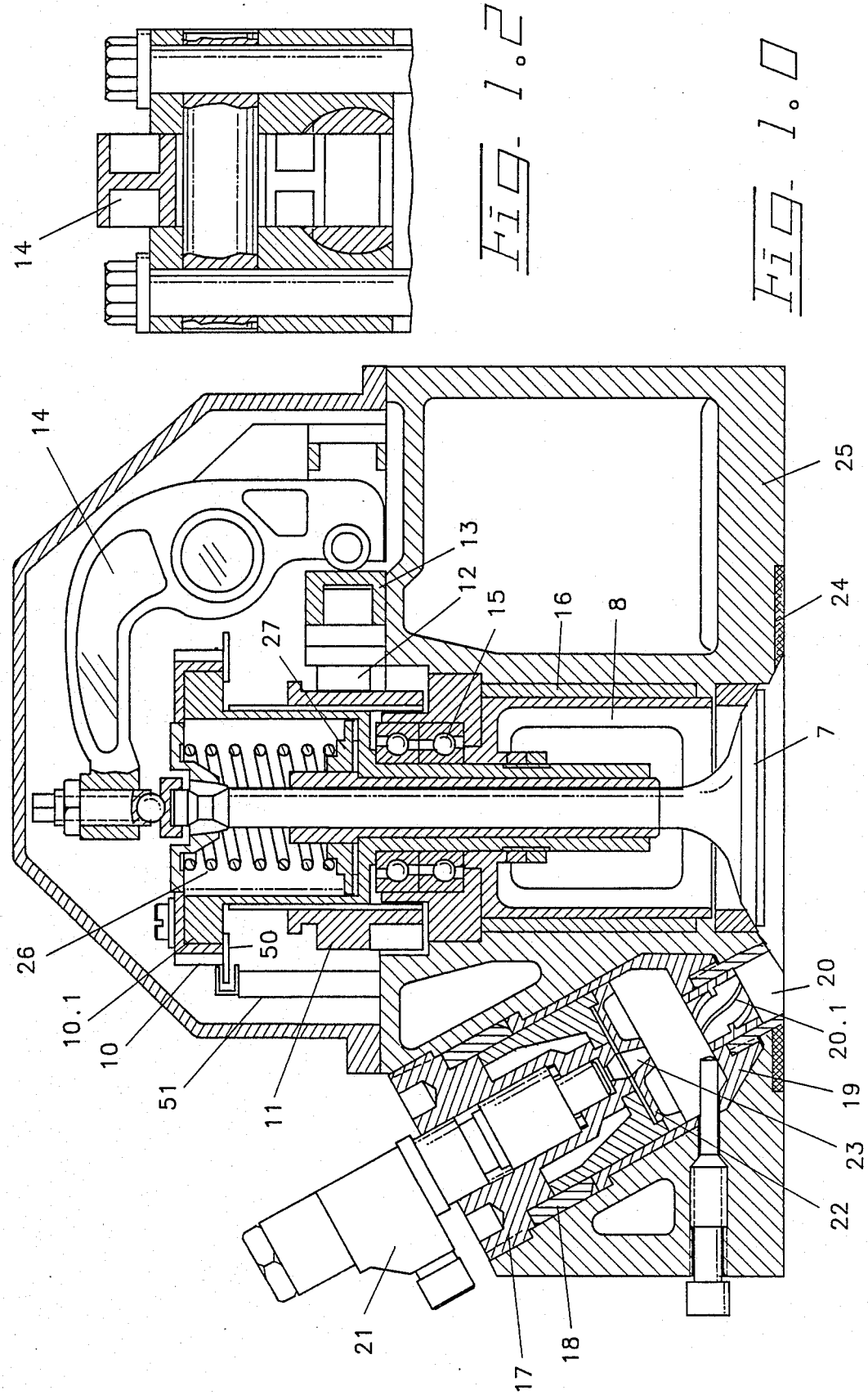

Fig. 4.1

INTERNAL REGENERATIVE COMBUSTION ENGINES WITH THERMAL INTEGRATED OPTIMIZED SYSTEM

BACKGROUND

This invention relates to internal combustion engines of the four and two stroke convertible reciprocating type wherein the thermal cycle is totally optimized in connection with: the integrated gas distribution intake and exhaust valve system, the combustion process, constant specific fuel consumption, variable geometry combustion chamber, variable compression ratio, automatic constant combustion pressure, variable expansion ratio, variable displacement capacity, and variable load and speed adjustment, all associated with a regenerative, internal thermal process (without cooling), and a very low friction mechanism (without hot lubricated surfaces). All these conditions are optimized and controlled by a central microprocessor associated with the engine.

The state-of-the-art engines (in production) utilize a conventional poppet valve system for intake and exhaust gas flows, in both spark ignition and diesel applications. This valve system has evolved after continuous development for over 80 years in the conventional overhead-valve configuration. These valves are actuated by cam operated push tubes (cam followers) and linkage systems or directly by the cams. The valve timing is fixed and is usually optimized for good breathing at the Design Point. The conventional valve systems are specific for two or four stroke engines, without the ability to change the type (to convert) of engine to use either cycles depending upon the power requirement.

Disadvantages of current poppet valves include:
(a) Porting area limited by cylinder bore size
(b) Crowding of the cylinder head (configuration).
(c) Valve overlap with limited scavenging.
(d) High thermal stress of the exhaust valves.
(e) Hot surfaces for gasoline engines limiting the antidetonation capacity of the combustion chamber.

The combustion process in the conventional combustion chamber with constant volume is optimized with the operational design point in relation to a fixed compression ratio, fixed expansion ratio and a constant volumetric capacity (displacement). These parameters provide a compromise solution for each specific engine in relation with the application. The detonation limit of the homogenous fuel-air mixture from the carburator and the effectiveness of the spark ignitors are the major barriers against the evolution of the gasoline engine. These factors limit the compression ratio and the supercharging level. The same situation holds for the gas engine, fueled by natural gases, in which the detonation (octane limit) of the engine is in fact the limit of the general performance and results in an extremely low efficiency.

The cooling system, associated with the lubrication requirement of the hot surfaces which have high friction components (pistons, rings, etc.) is a major source of heat loss.

All these factors limit the evolution of the thermal engines and are characteristic of the actual state-of-the-art for all types of engines, either for spark ignition or compression ignition.

This invention relates to a complex of integrated solutions correlated in an optimized energetic system in which: the gas distribution system for intake and exhaust is able to perform in both the two cycle and four cycle convertible modes or in a fixed mode for either cycle.

The mechanical distribution system is composed generally of an integrated system in which:
in one configuration the poppet valve is concentric with a group of double-sliding cam profiles an a rotary valve shaft, which act through a cam follower and a rocker-arm of the poppet valve, for both the convertible two and four stroke cycles;
in another configuration the poppet valve is concentric with a single cam profile and the rotary valve shaft, acting through a cam follower and a rocker arm of the poppet valve exclusively for either the two or four stroke cycles.

In another configuration, the poppet valve is concentric with a single-frontal cam profile in a common body with the pusher which acts up-and-down on the poppet valve, combining both a rotary and translatory movement for both the two or four stroke cycle.

All these configurations are associated with variable geometry intake and exhaust ports and channels located in the cylinder head and variable geometry scavenging ports located at the bottom dead point of the cylinder liner. The variation of the ports and the timing are governed by electromagnetic actuators under the control of a programmed microprocessor.

Attached to the common shaft is a magnetic disc supporting the magnetic code associated with the time base of the rotation. This is the source of the signals transmitted to the microprocessor which in turn command the actuators.

The hydroelectric gas distribution system is composed of an integrated hydraulic-piston-poppet valve concentric with a common hydraulic rotary cylinder and a rotary gas valve. These are associated with variable geometry intake and exhaust ports and channels located in the cylinder head and variable geometry scavenging ports located at the bottom dead point of the cylinder liner. The phase correlation and timing of the circulation of the hydraulic working fluid are controlled by a set of electro-magnetic valves and actuators controlled by an optimized microprocessor. The rotating movement of the hydraulic cylinder and rotary valve is activated by the crankshaft in the specific ratios of 1/1 for two stroke and ½ for the four stroke cycle.

The combustion process takes place in the variable geometry combustion chamber in which the volume ratio and the connection between the working spaces are optimized in relation with the energetic process in which:
the discontinuous variation is associated with a specific compression ratio, and
the continuous variation is associated with a variable compression ratio and a constant peak pressure of the cycle.

A different combustion chamber that has a specific variation of the entire geometry of the precombustion chamber is provided with a central sliding profile and produces a differential variation of the compression process in the precombustion chamber. A restrictive and variable connection passage that permits a high compression ratio in the cylinder for the air and a low compression ratio variation before combustion for the mixture (fuel and air) or simple gas is provided. A high turbulence level is maintained in the precombustion chamber at all rotation and piston speeds. Also, an antidetonation conditioner is provided which raises the connection surface passage in the time of ignition, combustion, expansion and exhaust reducing the gasodynamic losses. During this process the premixture is prevented from achieving a detonation condition. Also, the compression of the pure air separately from the rich mixture of fuel eliminates all the restrictions for compression and supercharging levels and any restrictions on the octane number of the fuel.

Related to this process is the fact that the compressed air is injected into the premixed fuel. This is exactly inverse in comparison with the diesel process in which the fuel is injected into the compressed air, and totally different from the Otto process in which the mixture between the fuel and air is constant. Based on the fact that the restrictive (reduced) connection section can be specifically adjusted for each rotation level, the optimized level of the turbulence can be maintained for all levels of rotation. This process produces the best mixture formation for all the possible operating regimes. The central piston with a variable profile is under the dual control of an adjustable spring which is associated with a hydraulic computerized system that provides the time of restriction and the position of the profile in relation with all phases of the cycle. During the restriction time coincident with the compression stroke, the variation of the compression pressure in the precombustion chamber is far smaller than the variation of the compression in the cylinder. During this restriction time, the new charge of gaseous fuel or gasoline rich air-mixture is injected into the precombustion chamber at a relatively low pressure, is heated, mixed and accelerated in a toroidal manner combined with a high turbulence level by the compressed air admitted through the restrictive variable channel connected to the cylinder.

The optimized variation of the combustion chamber volume is correlated with the optimized distribution phases. This process controls the quantity of air and the initial volume at the beginning of the compressor stroke.

The optimized variation of the-active volume of the cylinders (after the intake closing) is correlated with: the energetic regime, the variation of numbers of cycles (two or four stroke), the variation of the active number of cylinders, the continuous variation of the compression ratio, and the continuous variation of the expansion ratio. All these factors are the base of a total optimized thermal energetic system integrated in an internal combustion engine utilizing a programed microprocessor system.

The thermodynamic cycle of the engine is characterized by a variable compression stroke associated with an elongated expansion stroke. This process dramatically improves the efficiency of the engine at all loads and operating speeds.

In the energetic process of this internal combustion engine, utilizing a regenerative internal cycle, the cylinder walls and all the hot surfaces of the combustion chambers are made from regenerative cells in which the compressed air is cyclically infiltrated as in an insulating substance.

The cyclic process (the intake, compression expansion, exhaust and scavenging specific to the thermal piston engine) is the base of the continuous movement of the compressed air and provides the real INTERNAL RECOVERY of the energy equivalent to the cooling process in the normal diesel engine.

The regenerative thermal process, with the continuous exchange of the air to the inside and outside of the cells (especially the external radial movement of the air in the expansion stroke toward the cylinder space) produces a dynamic separation of the hot gases from the cylinder walls. This action produces a supplimentary dynamic air shield insulation, centralizing the hot combustion gases in the cylinder in a real adiabatic barrier between the hot sources (combustion gases) and the cylinder walls (regenerative cells).

The same strong radial movement of the high density air from the regenerative cells toward the central cylinder space eliminates the depositing of the carbon particulates on the walls of the regenerator, constituting a continuous air cleaning system.

The expansion stroke and the radial movement of the fresh compressed air accumulated in the regenerative cells, amplify the turbulence and supply preheated air for the final process of the combustion. This process reduces all the carbon, cleans the combustion process and eliminates the pollution problems associated with current state-of-the-art engines.

Also, the piston and the regenerative cells constitute an active sealing system in simulating a staggered labyrinth which provides a high quality sealing process.

The piston and the hot surfaces of the regenerative cells are not in contact and thus require no lubrication. The side thrust of the piston against the cylinder walls is supported by the internal zone of the metallic cylinder (like a crosshead) in which the low temperatures and lubrication are not effected.

The regenerative thermal engine may function in a combined cycle to produce an internal congeneration of power and superheated steam which is produced from the excess energy (waste heat) from the reciprocating internal-combustion engine.

The regenerative thermal engine with its internal combustion and steam generation makes a unique machine and its separate thermal cycles (gases and steam) develop themselves simultaneously in parallel, recuperatively, compensatorily and integratedly. The working agent is made up from the active phases (expansion and exhaust) of the burned gases of the internal-combustion engine and of the superheated steam, generated from the integrated recuperative regenerator. This homogenious mixture acts on the piston and expands through a turbine (if used on a supercharged-engine).

The residual energy of the internal-combustion engine is transferred to the Rankine cycle of the integrated steam generator by a complex heat transfer process (conduction, convection, radiation, contact and mixing) which takes place through the walls of the cylinders of the internal combustion engine. The heat energy in the cooling fluid then is radially injected into the regenerative cells (from outside to inside). The cooling fluid then passes through the stages of preheating, vaporization and superheating and finally injected simultaneously with the fuel into the inner cylinder cooling jacket. It then proceeds to a chamber, concentric with the combustion chamber, where simultaneously takes place the fuel combustion and the process of vaporization with the final superheating of the steam. The mixing of the two working agents and the expansion in the cylinder of the thermal reciprocating engine continued through the expansion of gases and steam in the turbine allow the complete utilization of the thermal energy (of the gases and the steam). The working agents expand completely, close to the condensation state of the steam, which process takes place in the noise-absorber of the condenser. This concludes the thermal passage route of the working fluid. The recovered water in the condenser (preferably at 80-90 degrees C.) is introduced again into the thermal cycle of the integrated thermal engine with an increased quantity of the condensated steam resulting from the hydrocarbon combustion. The system of the integrated regenerative thermal cycle, which carries and recuperates all the thermal energy generated in the engine cylinder from outside to inside automatically, creates an adiabatic state, eliminating the thermal loss and leads to the elimination of the cooling system (except for the supercharged air).

BRIEF DESCRIPTION OF THE DRAWINGS

FIG. 1 Shows a cross section through the four or two stroke-convertible engine with the mechanical distribution.

FIG. 1.0 Enlarged-partial cross section through the cylinder head of FIG. 1.

FIG. 1.1 Cross section through the camshaft.

FIG. 1.2 Cross section through the rocker-arm.

2.1 Shows an exhaust end and upper scavenging (+, −)-admission beginning.

2.2 Shows admission by the unique valve and supplementary admission by the ports at the cylinder base.

2.3 Shows compression finish and upper scavenging (+, −).

2.4 Shows exhaust by the unique valve and scavenging by the ports at the cylinder base.

2.5 Show the exhaust position for the unique valve.

Line A—Shows lining for low speed opertation with 0° advance for intake and exhaust.

Figure 3:
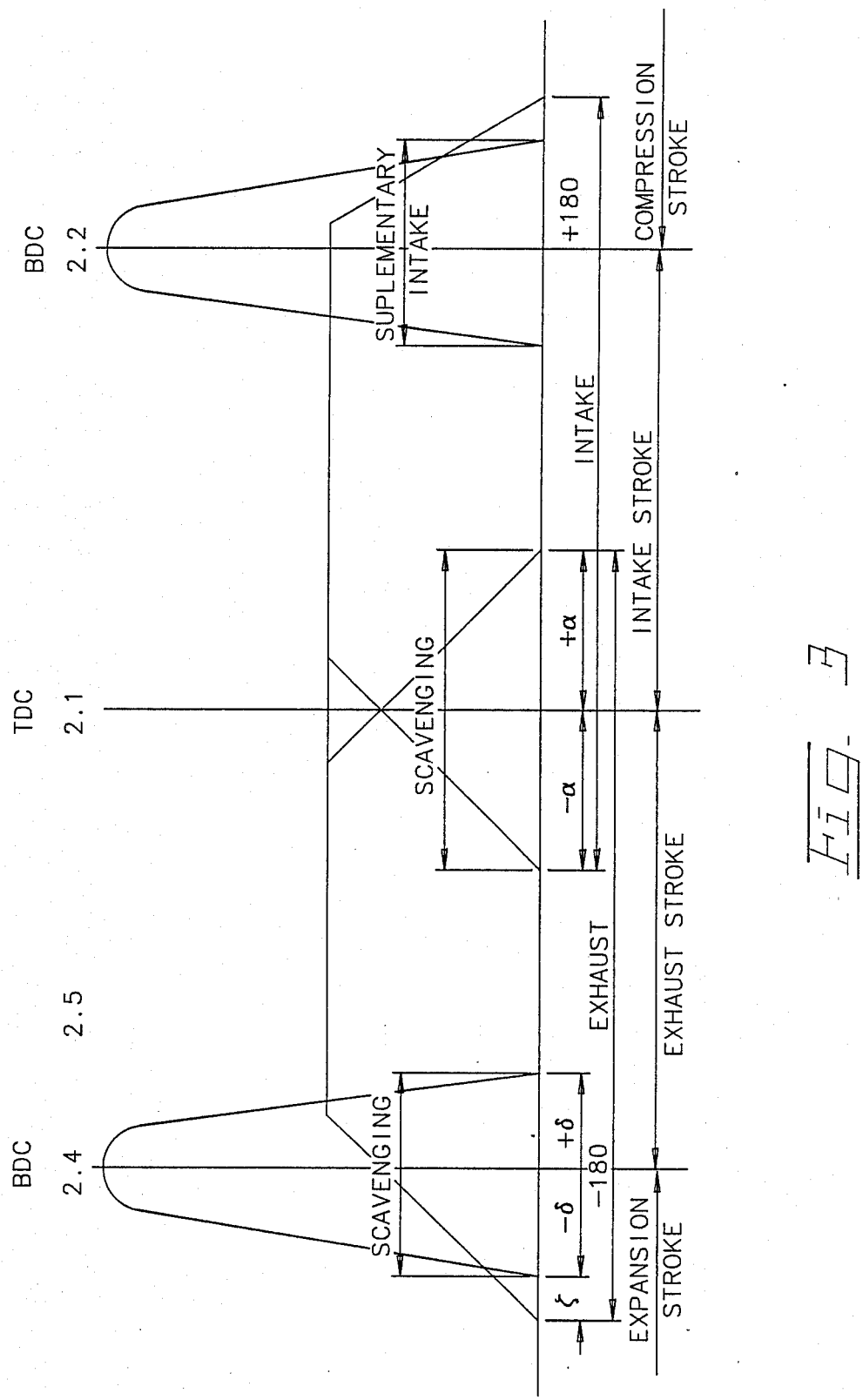

Line B-Shows timing for high speed penatration with:

$\alpha 1$ = advance for intake $\alpha 2$ = delay for intake $\beta 1$ = advance for exhaust $\beta 2$ = delay for exhaust FIG. 3 Schmatic diagram of the gas exchange.

Figure 4:
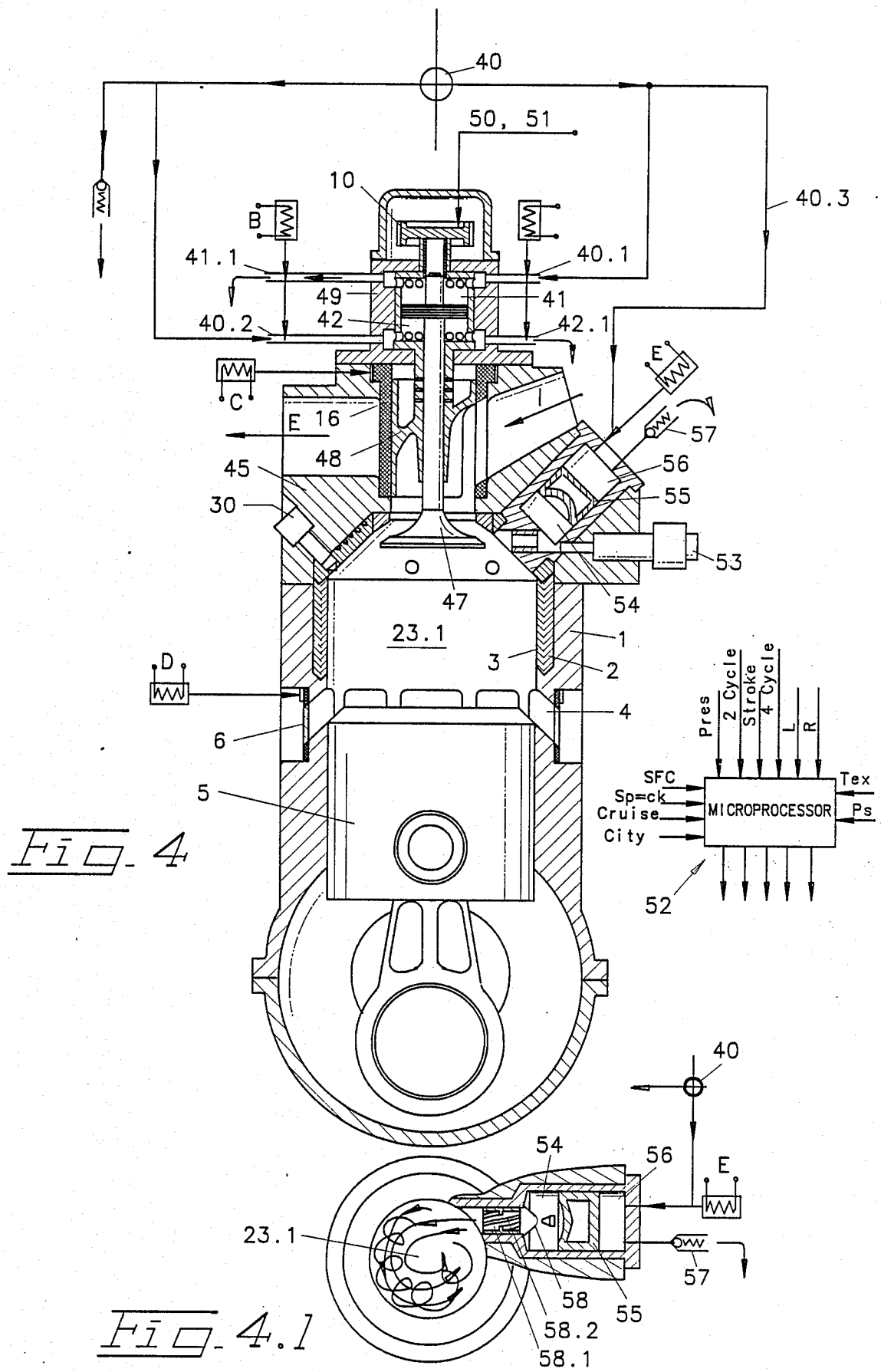

FIG. 4 Functional diagram and cross section through the two or four stroke convertible engine, showing the hydraulic/electric distribution.

FIG. 4.1 Cross section through the tangentional combustion chamber with variable geometry.

Figure 5:
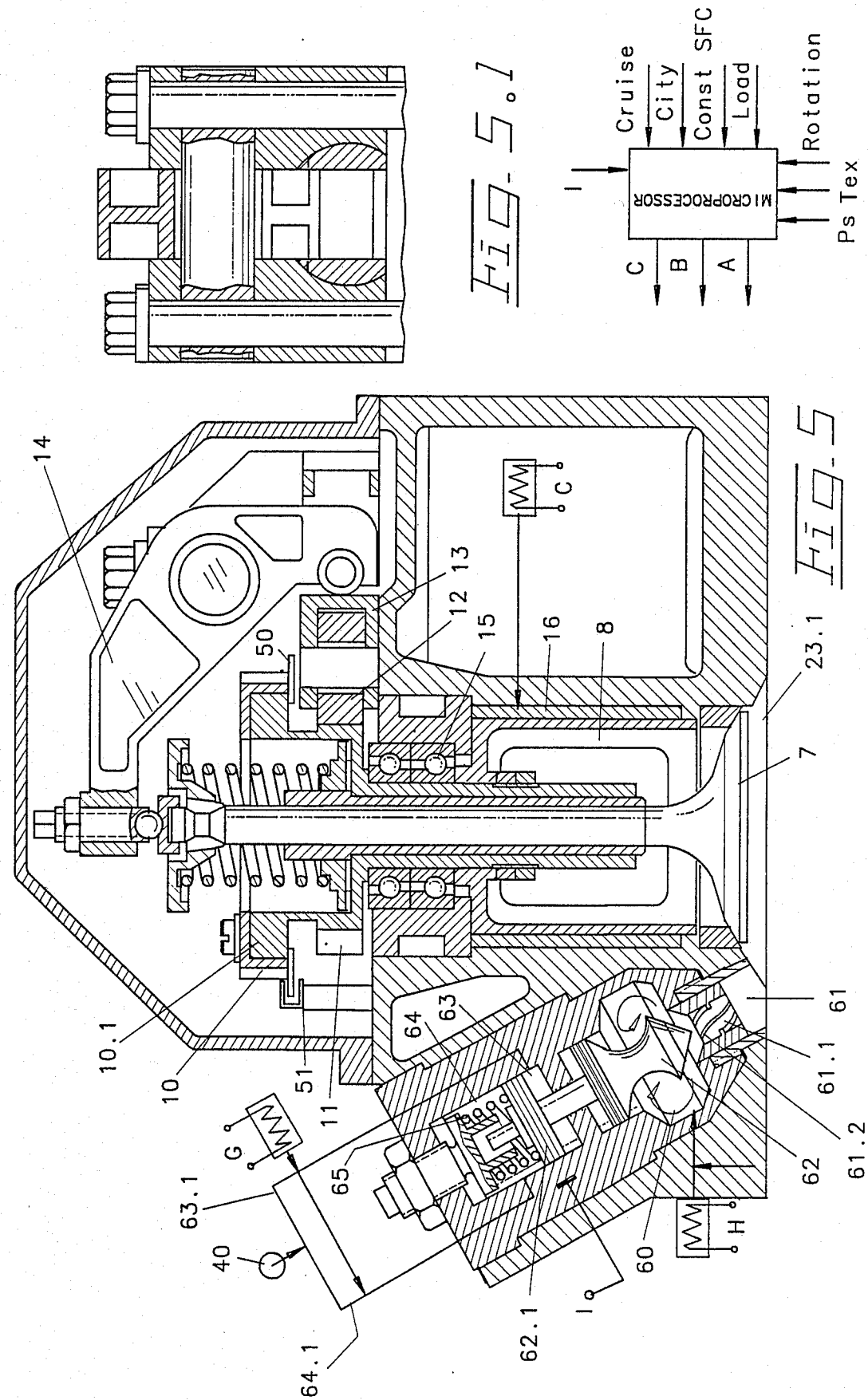

FIG. 5 Cross section (partial) through the engine with variable geometry, differential combustion chamber.

FIG. 5.1 Cross section through the rocker arm.

Figure 6:
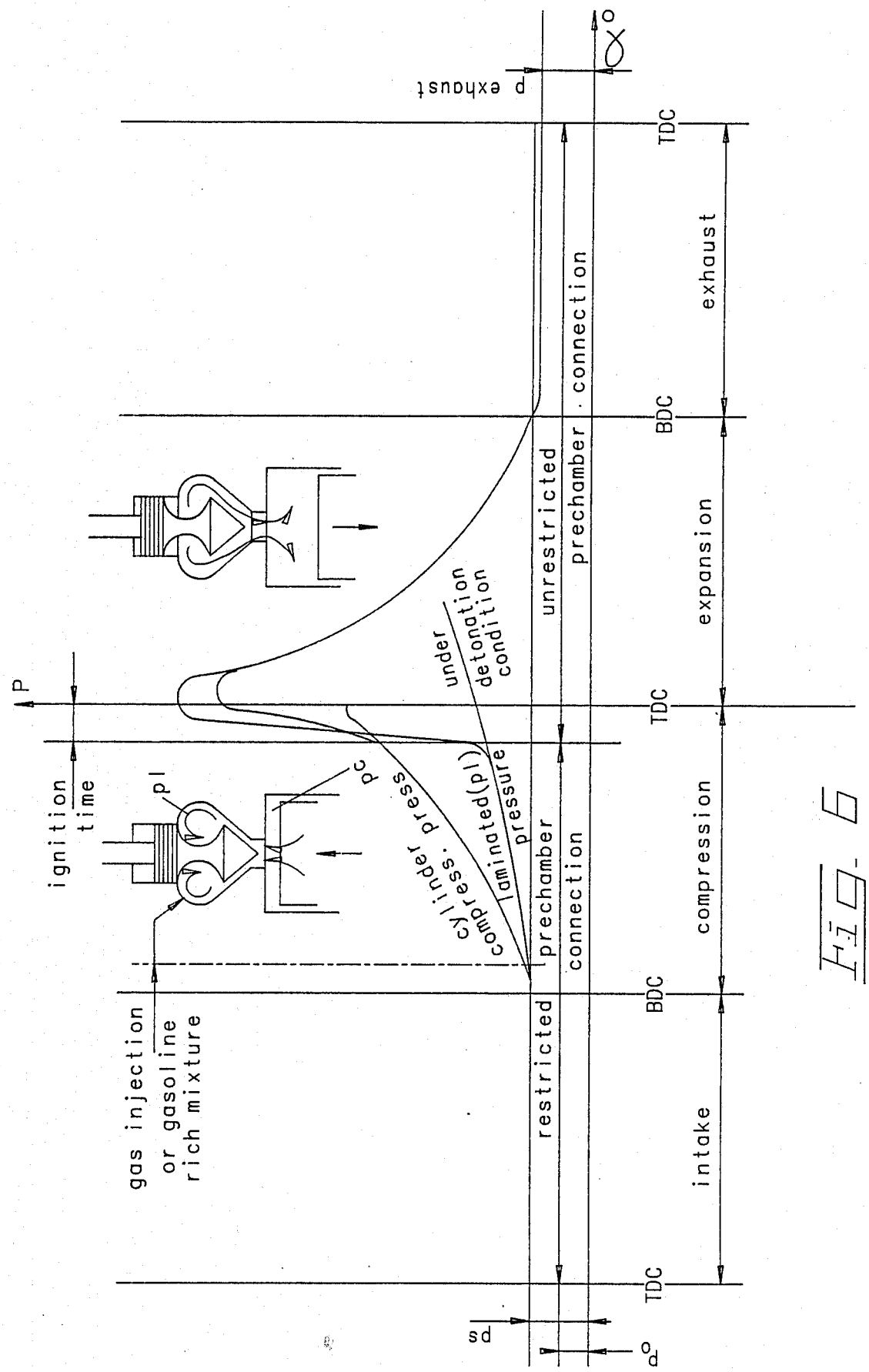

FIG. 6 Functional diagram of the engine of FIG. 5.

Figures 7, 8:
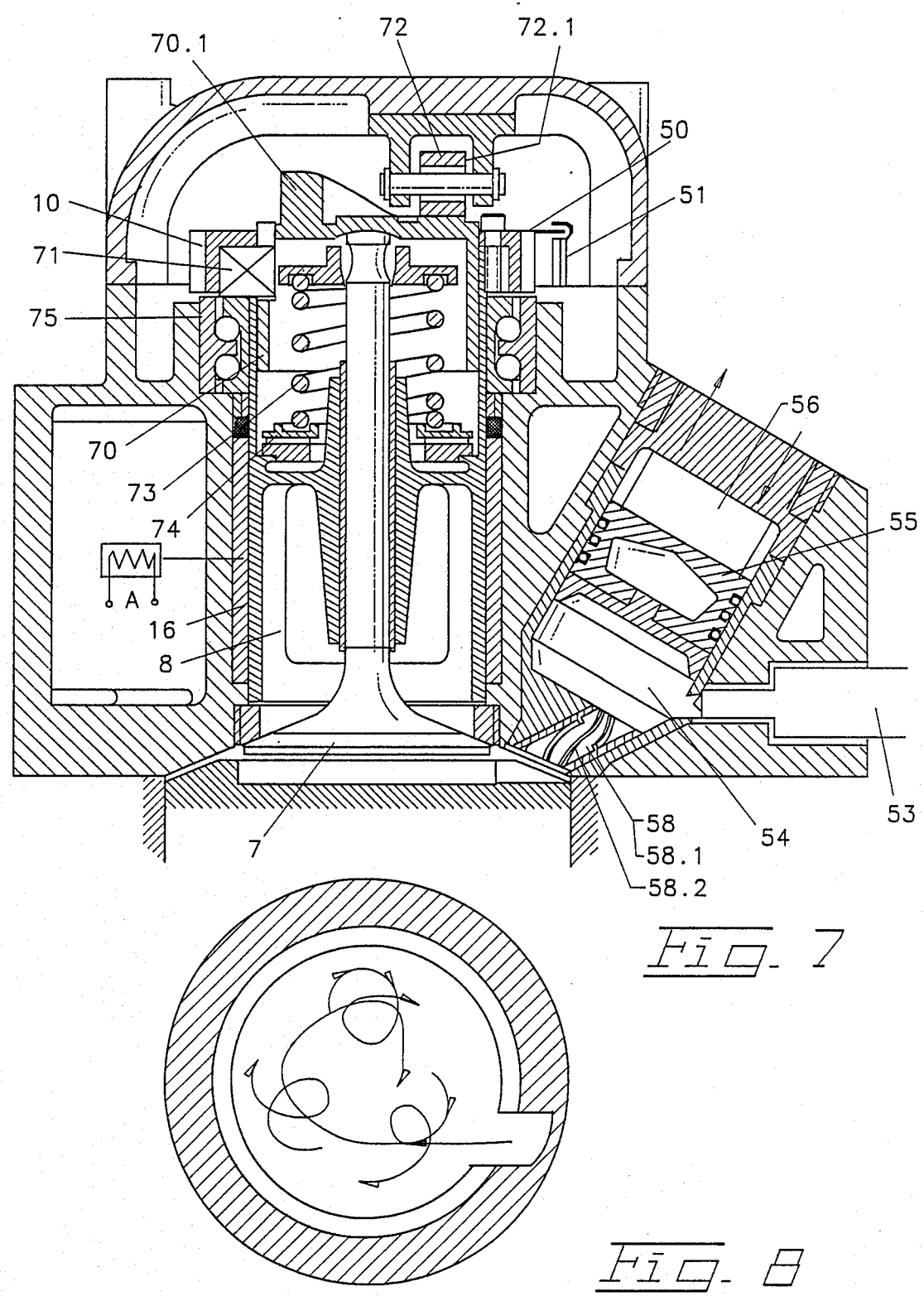

FIG. 7 shows a cross section through the cylinder head.

DESCRIPTION OF PREFERRED EMBODIMENTS

Referring now to the FIG. 1, FIG. 1.0, FIG. 1,1, and FIG. 1.2 the convertible four and two stroke engine, with mechanical distribution, having a combustion chamber with discontinuous variable geometry and regenerative thermal cycle is shown running in four stroke. The engine is made up of an outer block 1, provided with an inner regenerative jacket 2, with the working cylinder in the interior having circular (V shape) air groves or cells 3, on the inner part forming a labyrinth sealing system and transferring heat by regeneration. At the base of the cylinder are the ports 4 for supplementary air admission and scavenging, controlled by the crosshead differential piston 5, and by the sliding cylinder valve 6.

A unique poppet valve 7 is located in the cylinder head 25, being centered in a rotary distributor valve 8, driven in a n/2 ratio, by the gear 10 and the driving shaft 10.1, which is the support of the sliding double cam-profile 11 for two stroke or four stroke cycle. The double cam profile is provided with two stroke cam profile 11.1, and a four stroke cam profile 11.2, which are acting specifically on the camfollower 12 and through the pusher 13, which pushes the rocker 14 and in turn pushes the poppet valve 7. The rotary group (double cam profile and rotary valve) are supported by a double ball-bearings 15. A shifting mechanism (not in the figure) pushes and pulls the double cam profile 11 to provide a correlated dynamic relationship with the pusher 13 and rocker arm 14, specifically for two or four stroke cycle. The timing variator 16, controls the timing for the opening of the intake and exhaust. The precombustion chamber is composed of a central (sliding) body 17, a positioner 18 and, a combustion chamber body 19 having a nozzle 20 provided with a central channel and helicoidal and peripheral blades 20.1. The injector 21 is located in the central body, cooled by a water or oil jacket. The frontal face of the central body is protected by a refractory shield 22, which defines and ignition micro-chamber 23. Finally all the hot surfaces of the main combustion chamber 23.1 are protected by a flat head shield 24, made from a refractory material. The springs 26 and the axial bearing 27 assure the closing of the kinematic chain for the distribution. Attached to the gear 10 is a magnetic disc 50, supporting the magnetic code and the time base of the rotation, which provide the signal for the microprocessor through the pick-up 51, in relation with the optimized program of the engine.

Figure 2:
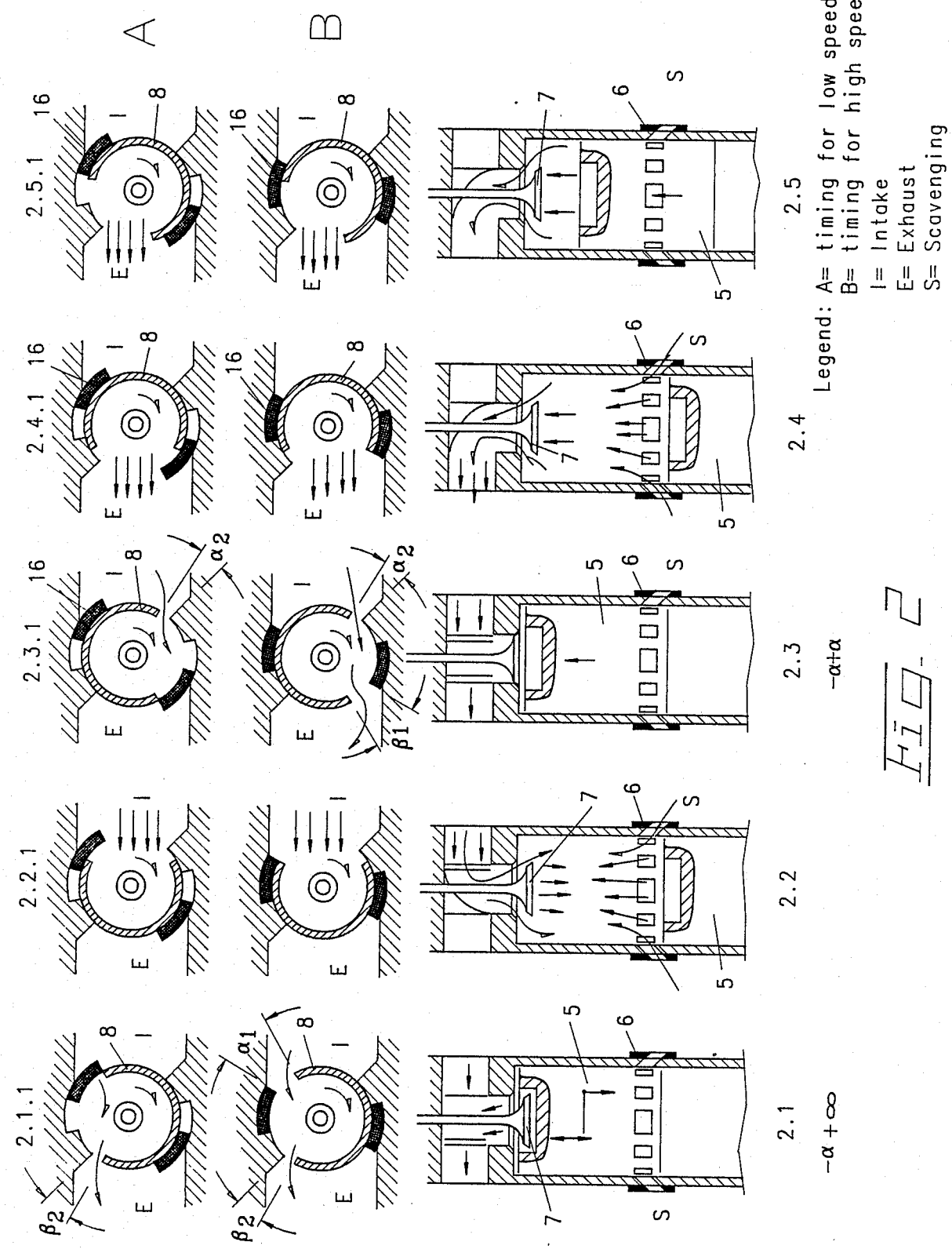
FIG. 2 inclusive of parts 2.1–2.5 and line designates A and B shows a functional diagram of the gas exchange process for the four stroke engine in five sequential cycle positions and two speed regime where.

The functional succession of the strokes in the four-stroke cycle (with the mechanical distribution of the single group of poppet-and-rotary-valve with variable geometry associated with the variable geometry of the cylinder liner ports), takes place as shown in the FIGS. 2.1, 2.2, 2.3, 2.4, 2.5 and line A and B.

Position 2.1—Exhaust cut-off when the central valve 7 is completely open, the piston 5 is in the top dead center and the rotary-distributor valve 8 is in the position indicated by FIG. 2.1.1, and there takes place the superior scavenging ($\alpha 1$ and $\alpha 2$, B1 and B2, are over 0°) line B, oriented for high speed operation. Low speed operation ($\alpha_1 = \alpha_2 \approx 0$, $\beta_1 = \beta_2 \approx 0°$) is shown on line A, in relation with the timing variator 16.

Position 2.2—The air admission takes place by the cylinder connection with the pipe I, while the piston 5 opens the air ports 4 by which a supplementary air-quantity is delivered. The total admission sections (central valve and cylinder ports) can be either equal or over the piston surface, leading to a maximum filling. The rotary-distributor valve 8 is in position indicated by FIG. 2.2.1 line A for low speed or line B for high speed, determined by the timing variator 16.

Position 2.3 The air compression takes place after the piston closes the air ports 4. While the piston 5 is moving up, the central valve 7 is closed and the rotative distributor valve 8 in position 2.3.1, and the timing variation 16, is in position—line A or line B. The fuel injection, and combustion take place at the end of the compression.

Position 2.4—Expansion takes place while the piston 5 is moving down when the unique valve 7 is open and produces the free exhaust of the burned gases. During the time the piston opens, the scavenging ports 4 which enters the scavenging air, pushes the burned gases out of cylinder. The amount of scavenging air is controlled by the sliding cylinder valve 6, which uncovers specific openings of the ports 4 in direct relation with the load and the permissible exhaust temperature.

Position 2.5—The piston 5 rises during the exhaust phase and pushes the gas mixture toward the turbocharger. During this phase, the unique valve 7 is completely open, and the rotative distributor valve 8 is in position 2.5.1, assuring connection between the cylinder and the exhaust manifold.

In FIG. 3, there is shown a schematical variation of the chrono sections. In connection with FIGS. 2, 2.1, 2.2, 2.3, 2.4, 2.5, the following conclusion can be drawn:

During the preliminary exhaust phase 2.4, the burned gases are strongly pushed from the cylinder with forced scavenging air through the ports 4, controlled by the sliding cylinder valve 6, assuring a perfect cleaning of the cylinder of consumed gases, maintaining the permissible exhaust temperature and assuring the inner cooling of the whole piston surface of the cylinder liner of the regenerative cells of the cylinder head and of the exhaust valve.

During the exhaust phase 2.5, the mixture of the gases and scavenging air that entered the ports 4, is exhausted by the piston 5 on moving to the top dead center position.

During the upper scavenging phase 2.1.1, the piston 5 blushes the used gases for exhaust and the rotative distributor valve 8 assures an upper scavenging 2.1.1, which completes the cleaning of the cylinder of useless gases (burned gases of expansion). During this time, the timing variator 16 assures a very low upper scavenging (line A) for low speed, and a high upper scavenging (line B) in which $(\beta_1+\beta_2)$ is the total overlapping angle.

During the admission phase, 2.2, the air enters through the rotative distributor valve 8 in the position 2.2.1 through the poppet valve 7, and through the ports 4, which are under the control of the sliding cylinder valve 6, proceeds into the cylinder, and completes filling the cylinder.

The operation of the convertible engine in the two stroke mode is carried out by changing the rotation ratio (from n/2 to n/1) between the crank-shaft to the common cam-and-valve shaft (10.1, 11, 8), and shifting the sliding cam 11 from the position 11.2 (four stroke) to the position 11.1 (two stroke). In this situation, the rotative distributor 8 is in continuous kinematic coincidence only with the exhaust channel E in the cylinder head, and the ports 4 are supplying the air for intake and scavenging. The fuel injection system is synchronized with the distribution and automatically passes to the new rotation regime.

The regenerative thermal process is based on the penetration of the freshly cooled high pressure air, supplied by the supercharging system with intercooling, during the scavenging process, the intake process and the compression process inside the cells 3 of the regenerative jacket 2.

In the compression stroke, a part of this air is accumulated inside the regenerative cells 3, absorbing the thermal energy accumulated in the walls of the regenerator.

The accumulation of the cooled compressed air in the cells 3 of the regenerator, produces a staggered labyrinth sealing system, which is an active counter pressure against any combustion gases escaping past the piston.

At the same time, in the expansion stroke, the compressed air accumulated inside the cells 3 expands toward the cylinder space, generating a dynamic-concentric-radial and centripetal flow which forms an envelope of air surrounding the hot gases, creating a pneumatic insulation between the hot gases and the walls. The heat radiated from the hot gases is in general the principal source of heat transfer to the cylinder walls.

Another effect, perhaps the most important, is the reexpansion of the compressed air, which is now reheated possessing a higher enthalpy, together with combusted gases, recovering the energy accumulated in the regenerative body.

This compressed and preheated air is an ideal additive to to the combustion process, which is supplied in the final stage of combustion, when the concentration of oxygen is reduced and the radial injection of the air to the combusted gases has an additional turbulent effect for enhanced combustion.

Finally, the air and the regenerative cells together form an ideal insulation and an adiabatic shield against the thermal energy which is normally lost through the cooling system.

The insulation effect is improved by the fact that the outside cells which also contain additional static air without any movement, form an additional insulation, a static shield, and together with the regenerative cells provide a real adiabatic protection against the heat lost to the outside surfaces.

Because the piston 5 is a perfect cylindrical body, without any contact in the hot zone of the cylinder walls which comprise the regenerative cells 3, lubrication and oil can be completely avoided, and mechanical losses eliminated. The piston is guided in the bottom zone of the cylinder by the cross head 27 and the guide 26, is completely protected from the hot gases, and is well lubricated in the low temperature region, which permits the smallest clearances between the crosshead 27 and the guide 26. The overhead 27.1 of the piston 5, and cross head 27 are insulated by a thermal shield 28, blocking the heat transfer and maintaining a low temperature at the bottom of the engine.

An alternative solution, is to guide the piston in the bottom zone of the cylinder, which is a conventional liner, well lubricated to operate at a very low temperature.

This zone is lubricated by air and a mirco-solid suspension of micro-particulates of graphite and $MoS_2$ (which are injected betweem the contact surfaces). The same air and solid micro-particulate suspension are injected into all the roller bearings, assuring the lubrication and the removal of the heat generated in the bearings. The cooled compressed air for this lubrication is supplied by the supercharging system. The recollection of the microparticulates is assured by a group of cyclone traps.

The air that is partially expanded and heated by this process is returned before the intercooler of the high stage supercharger for recompression in the final stage.

The two or four stroke convertible engine with hydroelectric distribution, and tangential combustion chamber with variable geometry, according to the invention of FIG. 4 and FIG. 4.1, is made up of an outer block 1, provided with the regenerative jacket 2, with the working cylinder in the interior having circular (V shape) air grooves or cells 3, on the inner part forming a labyrinth sealing system for heat transfer by regeneration. At the base of the cylinder are the ports 4, for supplimentary air admission and scavenging controlled by the piston 5, and by the sliding cylinder valve 6. A unique hydraulic piston-poppet-valve 47 located in the cylinder head 45, is centered in a common hydraulic rotary cylinder and a rotary gas valve 48, associated with variable geometry intake and exhaust ports and channels (I and E) under the control of the timing variator 16, which controls the time of opening for the intake and exhaust, are variable geometry scavenging ports 4 located at the bottom dead point of the cylinder liner, controlled by the sliding cylinder valve 6. The movement of this hydraulic piston-poppet-valve 47 results from the oil pressure created by high pressure source 40, which pushes oil in the upper space 41 or alternately in the bottom space 42. The hydraulic piston-poppet valve 47 is located in the hydraulic body 49, and is connected through the intake pipe 40.1 and 40.2, and exhaust hydraulic pipe 41.1 and 42.1 to the oil source. The opening time of the valve 47 is produced by the simultaneous opening of the pipe 40.1 and 42.1, by the electromagnetic actuator A, which permits the high pressure oil from the source 40 to penetrate into the upper space 41, pushing the piston-poppet valve 47 to open, and escape from the bottom space 42.

The closing of the valve 47 is produced by the total closing of the pipe 40.1 and 42.1, and the total opening of the pipe 40.2 and 41.1, by the electromagnetic actuator B, which permits the high pressure oil from source 40 to penetrate in the bottom space 42 and escape from the upper space 41.

In each of the embodiments the rotating movement is received from the gear 10, which is at the same time "the time base" for the electromagnetic timing code senses 50,51 for signals transmitted to the microprocessor 52. The timing variator 16 for the variable geometry cylinder head ports and channels is adjusted by the electromagnetic actuator C. Variations in the geometry of the cylinder liner ports 4 by the sliding cylinder valve 6 are controlled by the electromagnetic actuator D.

The water injection for internal steam congeneration is accomplished by the injector 30. The fuel injection is accomplished by the injectors 53. To obtain the variable geometry of the precombustion chamber 54, the free piston 55 is displaced in the pressurized oil space 56. The high pressure oil is injected sequentially through the pipe 40.3 when the electromagnetic valve-actuator E permits the access of this oil in the pressurized oil space 56. The relief valve 57 adjusted to the maximum preset combustion pressure, allows the oil to exit only when this maximum combustion pressure is exceeded.

The continuous automatic adjustment of the volume of the precombustion chamber 54, produces an automatic adjustment of the compression ratio in relation with the maximum constant combustion pressure, supercharging pressure, rotation and load.

The connection channel 58, between the precombustion chamber 54 and the main combustion chamber 23.1, is provided with a central axial passage 58.1, surrounded by combined helicoidal blades 58.2, which produce a combined helicoidal turbulence in the precombustion chamber 54, associated with the tangential movement specific for this type of chamber as detailed in FIG. 4.1. The centered axial location of the injector 53, creates the direct injection in the cylinder through the channel 58, and the indirect injection in the precombustion chamber 54, combining both processes in the best way for optimized turbulence and ignition.

The two or four cycle engine, with sequential and differential combustion chamber, according to FIG. 5, and FIG. 6, includes the same mechanical (hydraulic/electric) distribution, associated with a precombustion chamber with variable geometry 60, connected to the main combustion chamber 23.1 by the channel 61, having an axial passage 61.1 and a peripheral helicoidal passage 61.2 controlled by the central piston-profile 62 under the control of the hydraulic piston 62.1 which is separating the bottom hydraulic space 63 and the upper hydraulic space 64. Both spaces are connected with the pipes 63.1 and 64.1 to high pressure oil source 40 controlled by the electromagnetic actuator G. The piston 62.1 is biased by the spring 65. The position and the stroke of hydraulic piston 62.1 is detected by the stroke transducer I. The gas injection in the prechamber 60 is controlled by the electromagnetic actuator H, which connects the low pressure gas source, or gasoline rich mixture to the prechamber 60 during a restricted connection time between the prechamber space 60 and the cylinder volume. The restricted connection (with reduced passage) during the intake the partial compression stroke, maintains a very low pressure in the precombustion chamber while a high compression pressure develops in the engine's cylinder. The pressure separation protects the gas mixture against detonation and permits at the same time a high compression ratio and unlimited supercharging level for the engine.

In the optimum time for ignition, the actuator G opens both pipes 63.1 and 64.1, permitting a rapid movement (stroke) of the piston 62.1 and 62 under the force of the compression, completing the opening of the channel 61. This produces an air penetration from the cylinder to the precombustion chamber 60 coincident with the ignition moment, causing a violet turbulence and mixture between the gas and the compressed hot air.

The combustion process in the precombustion chamber 60, produces a reverse flow toward the cylinder space through the central helicoidal channel 61, 61.1 and 61.2 which adds the high turbulence of the precombusted gases to the existing turbulence in the cylinder. This process allows running with a complete range of mixtures from high lean to stoichiometric mixture, at a very high compression ratio and with an unlimited supercharging level without relation to the octane number of the gas or gasoline, permitting a very high efficiency of the cycle without limitation.

At the end of exhaust time, in a programmed moment, the actuator G reopens the hydraulic connection through the pipes 64.1 and 63.1, permitting the down stroke of the piston 62.1, moved by the expansion of the spring 65, producing another restricted connection between the prechamber 60 and the cylinder space, during the intake and compression time, and a new low pressure injection of gas or gasoline mixture in the precombustion chamber 60, for a new cycle. A complete understanding of this process is possible by studying FIG. 6 in connection with FIG. 5.

The two or four stroke engine with mechanical distribution and frontal cam-pusher with combined rotary and translatory movement, according to FIG. 7, is comprised of a poppet valve 7 concentric with a rotary valve 8, which is guided by the pusher 70, having a frontal cam profile 70.1. The rotary valve 8 and the pusher 70 are in common rotation through the key 71 and the gear 10, which assures the rotation of the group, producing the interaction with the fixed cam follower 72, provided with the roller 72.1, which transforms the rotation to a translation movement, which pushes the poppet valve 7 in its stroke for opening or closing, under the control of the springs 73, supported by the thrust bearing 74. The variable geometry of the timing ports 16 is governed by the actuator A in relation with the optimization program stored in the microprocessor. The bearing 75 supports the moving group (radially and axially). The magnetic disc disk 50 and the pick-up 51 generate a timing code utilized with the programed microprocessor. The solution is associated with the predescribed combustion chamber and regeneration cycle.

All these elements are assembled in a Thermo-Energetic Optimized System (TEOS) in which are optimized all the interactions between the components and the usage reguirements are: (w/o limitation)
  Cruise condition
  CITY—anti-pollution regime [smoke and noxes]
  Constant load
  Constant speed or rotation
  Constant SFC at all loads
  Constant exhaust temperature
  Variation of the supercharge pressure This TEOS is associated and assisted by a multiprogrammed microprocessor which controls the:
  Convertibility of the 2/4 stroke cycle
  The injection level, head release, timing, fuel control
  The variable geometry of the ports and the channels in the cylinder head, which assure the optimized timing of the rotary valve, (in relation with the FIG. 2—line A or B)
  The variable geometry of the scavenging cylinder bottom ports which assures the optimization of the scavenging, thermal stress protection at all loads.
  The variable geometry of all the combustion chambers
  The optimized association of the regenerative process and the internal steam cogeneration, with the internal combustion cycle.
  The optimized association with all types of fuel (liquid or gaseous)
  The optimized number of active cylinders and the total or partial deactivation of the rest of the cylinders
  The optimized compression ratio and the optimized expansion ratio

What I claim:

1. An optimized unitary energetic system for an internal combustion engine comprising:
   a block having a working cylinder with cylinder walls;
   a piston with a piston head reciprocal in the cylinder;
   a cylinder head connected to the block and capping the working cylinder having a gas distribution system for intake and exhaust associated with an optimized valve timing system, wherein the cylinder walls, piston head, and cylinder head define a main combustion chamber;
   a variable geometry precombustion chamber having a cylinder space with a cross sectional area substantially smaller than the cross section of the working cylinder and a passage connecting the precombustion chamber with the working cylinder, the precombustion chamber including a slide piston reciprocal in the cylinder space wherein the effective volume of the cylinder space is varied by the positioning of the slide piston, and wherein the slide piston includes a piston profile complimentary to a portion of the connecting passage for restricting the passage during periods of high compression in the working cylinder, and including further, means for varying the position of the slide piston in the space; and,
   injection means for timed injection of fuel into the precombustion chamber.

2. The system of claim 1 wherein the connecting passage of the precombustion chamber has helicoidal guide vanes for turbulent flow of combustion gases from the precombustion chamber to the working cylinder.

3. The system of claim 1 comprising further a microprocessor correlating certain factors for optimization of engine operation and being connected with the means for varying the slide piston in the precombustion chamber for controlling the displacement of the slide piston in the precombustion chamber in accord with optimized engine operating conditions.

4. The system of claim 3 wherein autoignition is timed by displacing the piston profile from the connecting passage to admit high pressure air from the working cylinder to the precombustion chamber.

5. The system of claim 3 wherein the means for varying the slide piston in the precombustion chamber comprises a hydraulic system actuated by an electromagnetic valve controlled by the microprocessor.

6. The system of claim 5 wherein the valve timing system of the gas distribution system is variable and has electronic actuation means connecting the valve timing system and the microprocessor for optimized engine operation in conjunction with the control of the slide piston in the precombustion chamber.

* * * * *